Patented Oct. 25, 1932

1,884,122

UNITED STATES PATENT OFFICE

WILFRED M. MURCH, OF HAMBURG, NEW YORK, ASSIGNOR TO NATIONAL ANILINE & CHEMICAL COMPANY, INC., OF NEW YORK, N. Y., A CORPORATION OF NEW YORK

PYRANTHRONE VAT DYE AND METHOD OF MAKING SAME

No Drawing.    Application filed October 25, 1927.   Serial No. 228,698.

The present invention relates to the production of new coloring matters which are vat dyestuffs suitable for dyeing textile fibres, especially cotton, brown shades. The dyed fibres or fabrics, and other material, dyed with the new coloring matters also form a part of the present invention.

The new coloring matters can be obtained by treating with a dehalogenating metal, such as copper, and preferably in the presence of a suitable solvent or diluent, the halogenated material which is soluble in nitrobenzene and obtained as a by-product in the manufacture of a halogenated pyranthrone by subjecting a crude pyranthrone to the action of a halogenating agent. The present invention particularly contemplates the production of said new dyestuffs from the nitrobenzene soluble product obtained in the chlorination of the condensation product or crude pyranthrone which has been produced by fusing with alcoholic caustic potash an impure 2.2'-dimethyl-1.1'-dianthraquinonyl obtained by heating with copper the crude 1-chlor-2-methylanthraquinone formed by the chlorination of 2-methylanthraquinone.

The new coloring matters are brown powders, insoluble in water, dilute acid, and dilute alkali. Their composition and constitution are unknown. They yield with alkaline reducing agents, such as aqueous alkaline hydrosulfite, a violet vat which dyes vegetable fibre violet shades which upon atmospheric oxidation change to reddish-brown shades of excellent fastness to washing.

The following example will further illustrate the invention, it being understood that the invention is not limited thereto. The parts are by weight.

Example:—135 parts of dry crude pyranthrone [obtained, for instance, by chlorinating 2-methylanthraquinone with chlorine in the presence of sulfuric acid as a diluent and of iodine as a catalyst, and isolating the crude product which consists largely of 1-chlor-2-methylanthraquinone (cf., United States Patent No. 1,504,164), subjecting the crude product thus obtained to the action of copper powder in the presence of nitrobenzene, filtering off the crude 2.2'-dimethyl-1.1'-dianthraquinonyl thus formed, and removing the copper and copper salts therefrom by the action of dilute nitric acid, (cf., United States Patent No. 828,778; Ber. 45,689 (1912) ), and then fusing the impure 2.2'-dimethyl-1.1'-dianthraquinonyl, which is substantially free from copper or its salts, with alcoholic caustic potash as described in United States Patent No. 856,811 whereby crude pyranthrone is obtained], is added to 1400 parts dry nitrobenzene. The resulting mixture is heated to about 200° C. for one-half to one hour to remove any moisture or water present, and then cooled to 50° C. 2.8 parts iodine and 270 parts sulfuryl chloride are added thereto and the mixture, with agitation and under a reflux condenser, is heated to 140°–145° C. for about three hours or until the chlorination is complete. The reaction-mixture is cooled to about 90°–100° C., filtered, and the filter-cake washed with warm nitrobenzene (about 250 parts). The filter-cake is comprised chiefly of a chlorinated pyranthrone, which is practically insoluble in nitrobenzene, and may be freed from nitrobenzene by washing with benzene. The nitrobenzene filtrate, to which the nitrobenzene washings have been added, and which contains in solution the intermediate from which the dyestuff of the present invention is produced, is distilled in a current of steam to remove the nitrobenzene, and the chlorinated residue is filtered off, washed with water, and dried. 65 parts of the dry residue, which contains about 12 to 16 percent of combined chlorine, are dissolved in an equal amount of nitrobenzene and the mixture heated to 190–200° C. for 30–45 minutes to drive off any moisture present. 20 parts of copper-bronze powder are then added and the mixture, with stirring and under an air-cooled reflux condenser, is heated at 210°–212° C. for about 10 hours. It is cooled to about 35° C., filtered, and the residue washed first with warm nitrobenzene and then with benzene. It is then heated in suspension with about 75 parts of dilute nitric acid (e. g., about 30 to 35 percent strength) to remove the copper and copper salts which may be present, again filtered, and the insoluble residue comprising the new dyestuff is washed thoroughly with water and then dried.

In the above example, the nitrobenzene filtrate from the chlorinated pyranthrone may be directly heated with copper, or it may be concentrated by distilling off a part of the nitrobenzene, preferably under a vacuum, and then heated with copper instead of isolating the residue from the nitrobenzene and treating the isolated and dried residue. Other dehalogenating metals equivalent to copper may be used.

The dyestuff thus obtained is, in the dry state, a brown powder insoluble in water, dilute acids, dilute alkali, and benzene. No formula can be assigned to it since its constitution is not known. It contains very little, if any, chlorine in its composition. It is slightly soluble in boiling glacial acetic acid with a yellow color showing a green fluorescence. It is also slightly soluble in boiling nitrobenzene with an orange color showing a green fluorescence but is substantially insoluble in cold nitrobenzene. It is soluble in concentrated sulfuric acid giving a greenish-brown solution which upon dilution with water gives a brown precipitate. It forms a violet colored vat with alkaline sodium hydrosulfite, which vat dyes cotton violet shades which upon exposure to air change to reddish-brown shades. The dyeings are fast to washing and substantially unaffected by dilute acid or alkaline solutions.

I claim:

1. The process of producing a vat dyestuff, which comprises subjecting to the action of a dehalogenating metal the nitrobenzene soluble halogenated product which is obtainable in the halogenation of a crude pyranthrone produced by the condensation of a 2.2'-dimethyl-1.1'-dianthraquinonyl compound.

2. A dyestuff of the character described, obtainable by subjecting to the action of copper the nitrobenzene soluble chlorinated product produced in the chlorination of a crude pyranthrone which has been obtained by the condensation of an impure 2.2'-dimethyl-1.1'-dianthraquinonyl, said dyestuff in the dry state being a brown powder substantially insoluble in water, dilute acid, dilute alkali, benzene and cold nitrobenzene, somewhat soluble in boiling glacial acetic acid to give a yellow solution showing a greenish fluorescence, slightly soluble in boiling nitrobenzene to give an orange solution showing a greenish fluorescence, soluble in concentrated sulfuric acid to give a greenish-brown solution which upon dilution with water produces a brown precipitate, and with alkaline sodium hydrosulfite forms a violet colored vat which dyes cotton violet shades which change to reddish-brown shades on exposure to the air.

3. The herein described dyestuff which in the dry state is a brown powder substantially insoluble in water, dilute acid, dilute alkali, benzene and cold nitrobenzene, slightly soluble in boiling glacial acetic acid giving a solution with a yellow color which shows a green fluorescence, slightly soluble in boiling nitrobenzene forming a solution with an orange color which shows a green fluorescence, soluble in concentrated sulfuric acid giving a greenish-brown solution which upon dilution with water gives a brown precipitate, and with an alkaline sodium hydrosulfite solution forms a violet colored vat which dyes cotton violet shades which change to reddish-brown shades upon exposure to the air.

4. In the production of a vat dyestuff, the process which comprises subjecting to the action of copper, the nitro-benzene-soluble halogenated product which is obtainable in the halogenation of a crude pyranthrone produced by the condensation of a 2.2'-dimethyl-1.1'-dianthraquinonyl compound.

5. In the production of a vat dyestuff, the process which comprises subjecting to the action of a dechlorinating metal, the nitrobenzene-soluble chlorinated product which is obtainable in the chlorination of a crude pyranthrone produced by the condensation of a 2.2'-dimethyl-1.1'-dianthraquinonyl compound.

6. In the production of a vat dyestuff, the process which comprises subjecting to the action of copper, the nitro-benzene-soluble chlorinated product which is obtainable in the chlorination of a crude pyranthrone produced by the condensation of a 2.2'-dimethyl-1.1'-dianthraquinonyl compound.

7. In the production of a vat dyestuff, the process which comprises subjecting to the action of a dechlorinating metal in the presence of nitrobenzene, the nitrobenzene-soluble chlorinated product which is obtainable by the action of sulfuryl chloride on a crude pyranthrone produced by heating 2.2'-dimethyl-1.1'-dianthraquinonyl with a condensing agent.

8. In the production of a vat dyestuff, the process which comprises subjecting to the action of copper in the presence of nitrobenzene, the nitrobenzene-soluble chlorinated product which is obtainable by treating with sulfuryl chloride the crude pyranthrone produced by heating impure 2.2'-dimethyl-1.1'-dianthraquinonyl with alcoholic caustic potash.

9. A dyestuff of the character described, obtainable by the action of a dehalogenating metal on the nitrobenzene-soluble halogenated product which is obtainable in the halogenation of a crude pyranthrone produced by the condensation of a 2.2'-dimethyl-1.1'-dianthraquinonyl compound, said dyestuff in the dry state being a brown powder substantially insoluble in water, in dilute acid, in dilute alkali, and in benzene, slightly soluble in boiling glacial acetic acid giving a yellow-colored solution having a green fluorescence, slightly soluble in boiling nitrobenzene giving an orange-colored solution having a green fluorescence, soluble in concentrated sulfuric acid giving a greenish-brown solution which upon dilution with water gives a brown precipitate, and soluble in an alkaline sodium hydrosulfite solution giving a violet colored vat which dyes cotton violet shades which, upon exposure to air, change to reddish-brown shades.

10. A dyestuff of the character described, obtainable by the action of copper on the nitrobenzene-soluble halogenated product which is obtainable in the halogenation of a crude pyranthrone produced by the condensation of a 2.2'-dimethyl-1.1'-dianthraquinonyl compound, said dyestuff in the dry state being a brown powder substantially insoluble in water, in dilute acid, in dilute alkali, and in benzene, slightly soluble in boiling glacial acetic acid giving a yellow-colored solution having a green fluorescence, slightly soluble in boiling nitrobenzene giving a solution having a green fluorescence, soluble in concentrated sulfuric acid giving a greenish-brown solution which, upon dilution with water, gives a brown precipitate, and soluble in an alkaline sodium hydrosulfite solution giving a violet-colored vat which dyes cotton violet shades which, on exposure to air, change to reddish-brown shades.

11. A dyestuff of the character described, obtainable by the action of a dechlorinating metal on the nitrobenzene soluble chlorinated product which is obtainable in the chlorination of a crude pyranthrone produced by the condensation of a 2.2'-dimethyl-1.1'-dianthraquinonyl compound, said dyestuff in the dry state being a brown powder substantially insoluble in water, in dilute acid, in dilute alkali, and in benzene, slightly soluble in boiling glacial acetic acid giving a yellow-colored solution having a green fluorescence, slightly soluble in boiling nitrobenzene giving an orange-colored solution having a green fluorescence, soluble in concentrated sulfuric acid giving a greenish-brown solution which, upon dilution with water, gives a brown precipitate, soluble in an alkaline sodium hydrosulfite solution giving a violet-colored vat which dyes cotton violet shades which upon exposure to air change to reddish-brown shades.

12. A dyestuff of the character described, obtainable by the action of a dechlorinating metal in the presence of nitrobenzene on the nitrobenzene-soluble chlorinated product which is obtainable by the action of sulfuryl chloride on a crude pyranthrone produced by heating an impure 2.2'-dimethyl-1.1'-dianthraquinonyl with a condensing agent, said dyestuff in the dry state being a brown powder substantially insoluble in water, in dilute acid, in dilute alkali, and in benzene, slightly soluble in boiling glacial acetic acid giving a yellow-colored solution having a greenish fluorescence, slightly soluble in boiling nitrobenzene giving an orange-colored solution having a greenish fluorescence, soluble in concentrated sulfuric acid giving a greenish-brown solution which, upon dilution with water, gives a brown precipitate, and with sodium hydrosulfite solution forming a violet-colored vat which dyes cotton violet shades which, upon exposure to air, change to reddish-brown shades.

13. A dyestuff of the character described, obtainable by the action of copper in the presence of nitrobenzene on the nitrobenzene-soluble chlorinated product which is obtainable by treating with sulfuryl chloride the crude pyranthrone produced by heating 2.2'-dimethyl-1.1'-dianthraquinonyl with alcoholic caustic potash, said dyestuff in the dry state being a brown powder substantially insoluble in water, in dilute acid, in dilute akali, in benzene, and in cold nitrobenzene, slightly soluble in boiling glacial acetic acid and in boiling nitrobenzene, soluble in concentrated sulfuric acid giving a greenish-brown solution which upon dilution with water gives a brownish precipitate, and upon treatment with sodium hydrosulfite solution forms a violet-colored vat which dyes cotton violet shades which upon exposure to air change to reddish-brown shades.

14. In the production of a vat dyestuff, the process which comprises subjecting to the action of a dehalogenating metal the nitrobenzene soluble halogenated product which is obtainable by halogenating pyranthrone.

15. In the production of a vat dyestuff, the process which comprises subjecting to the action of copper the nitrobenzene soluble chlorinated product which is obtainable by chlorinating pyranthrone.

16. In the production of a vat dyestuff, the process which comprises subjecting to the action of copper the nitrobenzene soluble chlorinated product which is obtainable by chlorinating pyranthrone with sulfuryl chloride in nitrobenzene as a solvent.

17. A dyestuff of the character described, obtainable by the action of a dehalogenating metal on the nitrobenzene soluble halogenated product which is obtainable by halogenating pyranthrone, said dyestuff being, in the dry state, a brown powder substantially insoluble in water, in dilute acid, in dilute alkali, and in benzene, slightly soluble in boiling glacial acetic acid giving a yellow colored solution having a green fluorescence, slightly soluble in boiling nitrobenzene giving an orange colored solution having a green fluorescence, soluble in concentrated sulfuric acid giving a greenish-brown solution which upon dilution with water gives a brown precipitate, soluble in an alkaline sodium hydrosulfite solution giving a violet colored vat which dyes cotton violet shades which upon exposure to air change to reddish-brown shades.

18. A dyestuff of the character described, obtainable by the action of copper on the nitrobenzene soluble chlorinated product which is obtainable by chlorinating pyranthrone in nitrobenzene with sulfuryl chloride in the presence of iodine as a catalyst, said dyestuff being, in the dry state, a brown powder substantially insoluble in water, in dilute acid, in dilute alkali, and in benzene, slightly soluble in boiling glacial acetic acid giving a yellow colored solution having a green fluorescence, slightly soluble in boiling nitrobenzene giving an orange colored solution having a green fluorescence, soluble in concentrated sulfuric acid giving a greenish-brown solution which upon dilution with water gives a brown precipitate, soluble in an alkaline sodium hydrosulfite solution giving a violet colored vat which dyes cotton violet shades which upon exposure to air change to reddish-brown shades, and said dyestuff containing substantially no chlorine in its composition.

In testimony whereof I affix my signature.

WILFRED M. MURCH.